US012180039B2

(12) United States Patent
Lo Jacono et al.

(10) Patent No.: US 12,180,039 B2
(45) Date of Patent: Dec. 31, 2024

(54) SLIDING GUIDE SHOE, COUNTERWEIGHT EQUIPPED WITH SLIDING GUIDE SHOES, AND ELEVATOR SYSTEM

(71) Applicant: Inventio AG, Hergiswil (CH)

(72) Inventors: Romeo Lo Jacono, Gravesano (CH); Alessandro D'Apice, Ebikon (CH)

(73) Assignee: INVENTIO AG, Hergiswil (CH)

( * ) Notice: Subject to any disclaimer, the term of this patent is extended or adjusted under 35 U.S.C. 154(b) by 0 days.

(21) Appl. No.: 18/257,597

(22) PCT Filed: Dec. 16, 2021

(86) PCT No.: PCT/EP2021/086224
§ 371 (c)(1),
(2) Date: Jun. 15, 2023

(87) PCT Pub. No.: WO2022/136119
PCT Pub. Date: Jun. 30, 2022

(65) Prior Publication Data

US 2024/0034597 A1 Feb. 1, 2024

(30) Foreign Application Priority Data

Dec. 22, 2020 (EP) ..................................... 20216579

(51) Int. Cl.
*B66B 7/04* (2006.01)
*B66B 17/12* (2006.01)

(52) U.S. Cl.
CPC .............. *B66B 7/047* (2013.01); *B66B 17/12* (2013.01)

(58) Field of Classification Search
CPC B66B 7/04; B66B 7/041; B66B 7/042; B66B 7/043; B66B 7/044; B66B 7/045; B66B 7/046; B66B 7/047; B66B 7/048; B66B 17/12
See application file for complete search history.

(56) References Cited

U.S. PATENT DOCUMENTS 6,085,874 A * 7/2000 Uchino ............... B66B 11/0055 187/250
9,714,158 B2 * 7/2017 Nakamura .............. B66B 17/12
2007/0246307 A1 * 10/2007 Cloux ..................... B66B 17/12 187/404
2013/0126278 A1 * 5/2013 Sederholm ................ B66B 7/04 187/409

FOREIGN PATENT DOCUMENTS

CN 86104695 A * 4/1987 ............ B66B 7/047
CN 112919285 A * 6/2021
(Continued)

*Primary Examiner* — Minh Truong
(74) *Attorney, Agent, or Firm* — William J. Clemens; Shumaker, Loop & Kendrick, LLP

(57) ABSTRACT

A sliding guide shoe for guiding a counterweight includes a single-piece guide element made of a plastic material. The guide element has an engagement element that extends in the longitudinal direction and can be brought into interlocking engagement in a cutout formed in a yoke of a counterweight frame. The guide element further includes a collar engaging around the cutout and forming a stop for positionally securing the guide element, the collar adjoining the engagement element.

16 Claims, 6 Drawing Sheets

(56) References Cited

FOREIGN PATENT DOCUMENTS

| | | | | | |
|---|---|---|---|---|---|
| DE | 20315915 | U1 | | 3/2005 | |
| EP | 3199483 | A1 | | 8/2017 | |
| IT | 202100004625 | A1 | * | 8/2022 | ............. B66B 7/047 |
| JP | S62194673 | U | | 12/1987 | |
| JP | H06156929 | A | * | 6/1994 | ............. B66B 7/047 |
| JP | 2001270669 | A | * | 10/2001 | ............. B66B 7/047 |
| JP | 2004292110 | A | * | 10/2004 | ............. B66B 7/047 |
| WO | 2014027399 | A1 | | 2/2014 | |
| WO | 2020127303 | A1 | | 6/2020 | |
| WO | 2020127787 | A1 | | 6/2020 | |

* cited by examiner

SLIDING GUIDE SHOE, COUNTERWEIGHT EQUIPPED WITH SLIDING GUIDE SHOES, AND ELEVATOR SYSTEM

FIELD

The invention relates to a sliding guide shoe. Furthermore, the invention relates to a counterweight equipped with such sliding guide shoes. Finally, the invention relates to an elevator system.

BACKGROUND

Elevator systems for conveying people and goods contain elevator cars that can be moved up and down in an elevator shaft. The elevator cars can be moved in the vertical elevator shaft via support means, for example in the form of support ropes or support belts, by means of a drive unit. In addition to the elevator car, the elevator system usually comprises at least one counterweight that is moved in opposite directions in the elevator shaft. The elevator car and at least one counterweight run in guide rails. Guide shoes are usually used to guide elevator cars and counterweights, wherein the guide shoes can be designed as sliding guide shoes or roller guide shoes.

Known and common are, for example, multi-part sliding guide shoes comprising a guide shoe housing and insert, as known from DE 203 15 915 U1. Such or similar sliding guide shoes are fastened to vertical supports of counterweight frames. Such an arrangement with a counterweight frame and sliding guide shoes attached to it is shown, for example, in EP 3 199 483 A1. WO 2014/027399 A1 concerns a further counterweight that is equipped with sliding guide shoes for guidance.

SUMMARY

It is an object of the present invention to avoid the disadvantages of the known and in particular to provide a sliding guide shoe for guiding an elevator car or a counterweight of an elevator, which is characterized by a simple structure and better handling with respect to installation.

According to the invention, these and other objects are solved with the sliding guide shoe having the features described below. The sliding guide shoe for an elevator system for transporting passengers or goods is used to guide an elevator car or a counterweight along a guide rail extending in the drive or longitudinal direction. The sliding guide shoe comprises a guide element with a guide channel. The guide channel of the guide element is designed to complement a guide area of the guide rail and extends in the longitudinal direction. This guide area, which is formed for example by a web-like protrusion of the guide rail or a spring of the guide rail, can be accommodated in the guide channel. The guide channel thus provides the sliding surface which, when the sliding guide shoe is installed or ready for operation in the elevator, can make sliding contact with the guide rail in the guide area.

The sliding guide shoe can consist of the guide element described. However, it would also be possible for the guide shoe to comprise additional components in addition to the guide element, such as a lubrication apparatus for oiling the guide rail.

The elevator car or counterweight may have a support structure. The support structure for carrying the elevator car can be, for example, a so-called catch or car frame. For the counterweight, the support structure can be a counterweight frame. The support structure may have at least one recess for mounting the sliding guide shoe. The guide element has a longitudinally extending engagement element that can be engaged in the recess of the support structure with a form closure. Furthermore, the guide element has a collar, which subsequently adjoins the engagement element with respect to the longitudinal direction, for engaging around the recess and for forming a stop for securing the guide element in position in the longitudinal direction. The collar is understood to be an elevation designed in the form of a flange, which forms a stop surface that is supported on the support structure with respect to the longitudinal direction when the guide part is inserted or placed in the recess. Such a guide element provided with an engagement element and a collar can be easily assembled. The guide element can be easily and yet accurately mounted to the support structure.

In a first embodiment, the guide element may be designed as a one-piece molded body made of a plastic. A preferably rigid plastic material can be used as the material for the molded body. The mentioned components of the guide element, i.e., the guide channel, the engagement element and the collar, are thus monolithically connected to one another. Such a plastic molded body can be produced cost-effectively. Another advantage is that the sliding guide shoe does not have to comprise any additional components; in particular, no larger metallic components such as a guide shoe housing are required. The guide element can be designed as a disposable component and can be easily and cost-effectively replaced at the end of its service life.

Particularly preferably, the guide element is an injection molded part. Such a guide element can be manufactured easily and with high precision.

For easy handling of the guide element with regard to installation, it can be advantageous if the engagement element for form closure with a recess, which is advantageously designed to be open to the guide area of the guide rail provided for guidance, is designed as a shell-like retaining pin which is inserted into the recess. For this purpose, the engagement element can be designed as a shell-like retaining pin with a U-shaped recess, particularly for form closure. If the recess is a round U-shaped recess, the retaining pin may have a semicircular outer contour that matches the round U-shaped recess. In relation to this outer contour, which is semicircular in cross-section, the collar can then be a flange portion projecting radially outward.

The guide element may further have an attachment portion for fixing the guide element to the support structure. Due to the attachment portion, it can be ensured that the sliding guide shoe can be connected directly to the elevator car or counterweight without additional components such as housing parts.

It is particularly preferred that the attachment portion is formed to the collar in the radial direction or at right angles to the longitudinal direction. Consequently, the attachment portion can also be part of the one-piece plastic molded body.

The guide element may have only one collar. However, it would also be conceivable to provide two collars. For this case, the guide element can have two collars opposite one another with respect to the longitudinal direction, such that when the guide element is inserted into the recess, the two collars enclose the support element from both longitudinal sides. The distance between the collars, or more precisely the distance between their stop surfaces, would then correspond to the thickness of the support structure in the area of the recess.

The attachment portion may have a hole for a screw to screw the guide element to the support structure. In this manner, a guide element inserted into or onto the support structure via the recess can be secured quickly and without great effort. Of course, it would also be conceivable to provide a plurality of screws for securing the guide element in the support structure instead of just one screw.

The hole can preferably be less than 10 cm, preferably less than 8 cm and particularly preferably less than 5 cm from the groove bottom of the guide channel or from the nearest area of the sliding surface of the guide channel. In this manner, a guide element with a slim and compact design is created.

Particularly when the guide element is made of plastic material, it is advantageous for the hole to be a through hole into which a metal bushing is inserted or otherwise disposed. The metal bushing can be connected to the plastic part, for example, by injection molding onto the metal bushing. The metal bushing ensures reinforcement of the attachment area for secure and durable positioning.

A further embodiment relates to a guide element segmented with respect to the longitudinal direction. The guide element may have two segments, wherein a first segment has the engagement element associated therewith and wherein a second segment has the collar associated therewith. The stop surface formed by the collar can thus provide the dividing line or plane between the two segments. The second segment may further comprise a longitudinally extending head part. Due to the head part, a sufficiently long guide channel is available for optimum guiding properties. Consequently, the guide channel is assigned to both segments or contained in both segments. For optimized guidance, the lengths of the two segments can preferably be roughly equal—measured in the longitudinal direction. The length of the second segment is preferably greater than the length of the first segment.

A further aspect of the invention relates to a counterweight for an elevator system having a counterweight frame as a support structure for the counterweight. The counterweight frame is used to hold weight elements. In the counterweight frame, for example, weight elements in the form of metal plates or concrete weights stacked on top of one another can be arranged therein and, in particular, fixed therein. The counterweight frame comprises at least one yoke and, in particular, an upper yoke and a lower yoke and beams connecting the upper yoke and the lower yoke. In the operational position, the yokes extend in the horizontal direction, wherein the upper yoke and the lower yoke respectively close off the counterweight frame at the top and bottom; the aforementioned beams extend in the vertical direction. The counterweight further has at least one sliding guide shoe and, in particular, a sliding guide shoe as described above, wherein the sliding guide shoe can be guided along a guide area of a guide rail designed as a protrusion or spring for guiding the counterweight. The respective yoke has a horizontal plate to which at least one sliding guide shoe is fastened. The horizontal yoke plate has at least one recess into which the guide rail projects to form a groove guide and in which the sliding guide shoe is positively received. Due to this arrangement, no additional means are required to ensure groove guiding properties. The sliding guide shoe can be easily mounted in the counterweight frame.

The yoke plate has preferably at least two recesses for the receptacle of sliding guide shoes such that guidance can be provided on two sides. Particularly preferable, both the upper and lower yoke each have two sliding guide shoes accommodated in recesses.

At least one of these recesses can be designed in a U-shape for the form closure receptacle of the sliding guide shoe, whereby an open recess can be obtained. The sliding guide shoe may have a guide element with a round groove bottom of a guide channel. For example, such a round groove bottom is particularly suitable for guiding a guide area formed by an envelope of a guide rail designed as a hollow profile.

Two recesses may be provided for each yoke on which sliding guide shoes are or will be mounted, wherein the recesses are directed towards one another and wherein one of the recesses is arranged in the respective yoke plate and the other recess is arranged on an extension piece fastening the yoke plate via releasable fastening means. Without these extension pieces, i.e., before the extension pieces are attached to the counterweight frame, the counterweight frame may be open enough to be loaded with the weight elements. Once loading is complete, the extension pieces are placed on the counterweight frame and fastened to it, for example, by means of screws.

Finally, a further aspect of the invention relates to an elevator system having an elevator car and a counterweight connected to the elevator car via support means and movable in the opposite direction to the elevator car, wherein the counterweight is the counterweight described above and the counterweight is in particular equipped with the sliding guide shoes described above for guiding the counterweight on guide rails. The elevator system can have one counterweight or, if necessary, two counterweights per elevator car.

The elevator system can have only one counterweight per elevator car. As a rule, such elevator systems have only one drive, for example a traction sheave drive, which is used to drive the support means and thus move the elevator car and the counterweight in opposite directions. The elevator car can be guided vertically up and down the elevator shaft between two guide rails as linear guides. The counterweight can also be guided on two guide rails. Thus, the elevator system can comprise a total of four guide rails, wherein the term “car guide rails” is known and commonly used for the car and “counterweight guide rails” for the counterweight. An alternative elevator system may comprise guide rails, each of which serves as a linear guide for both an elevator car and a counterweight.

DESCRIPTION OF THE DRAWINGS

Additional advantages and individual features of the invention are derived from the following description of an exemplary embodiment and from the drawings. In the drawings.

DETAILED DESCRIPTION

Figure 1:
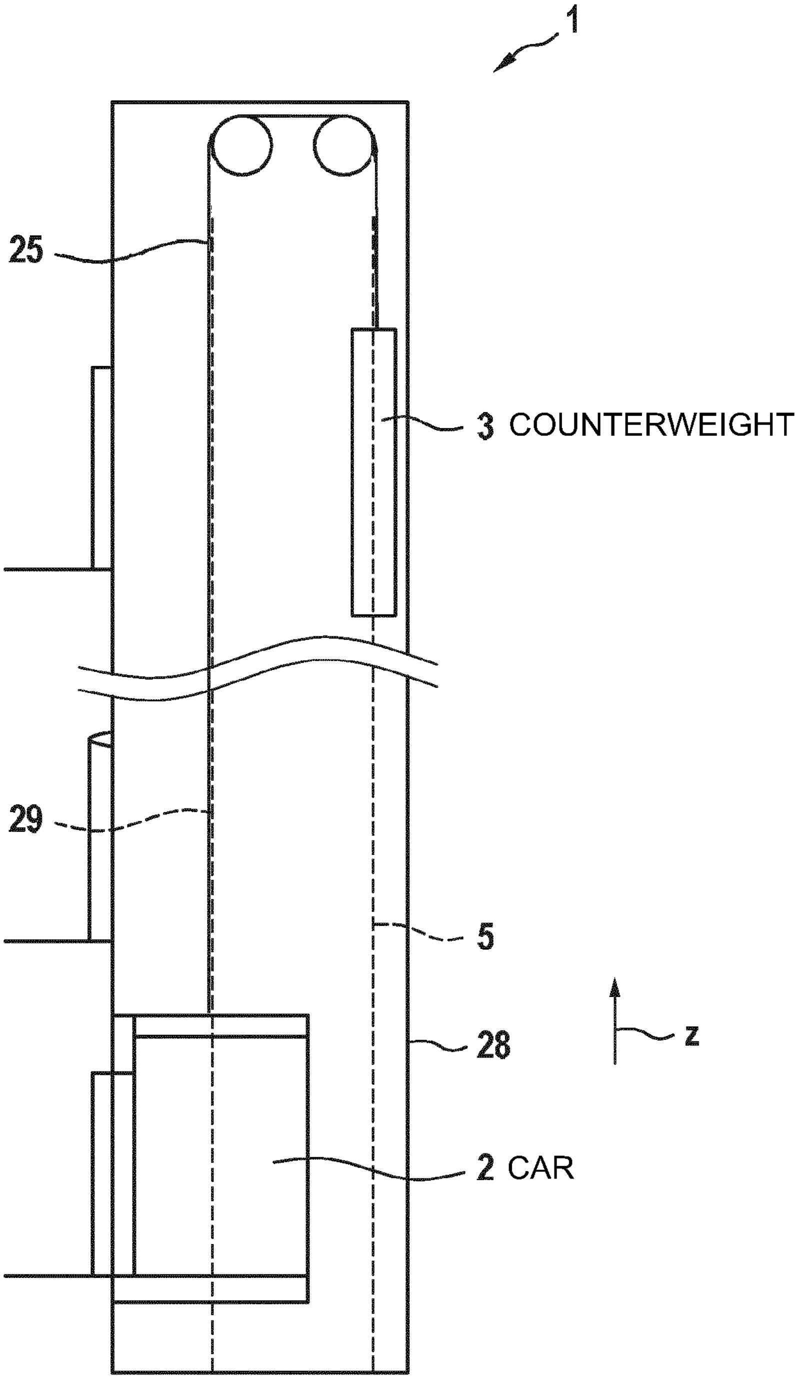
FIG. 1 shows a schematic diagram of an elevator system.

FIG. 1 shows an elevator installation, denoted by 1, for a multi-story building. The building has an elevator shaft 28 in which an elevator car 2 can be moved vertically up and down to individual floors for transporting people or goods. The direction of travel is indicated by an arrow z. The elevator system 1 of FIG. 1 is designed as a traction elevator system with a counterweight 3 movable in the opposite direction to the elevator car 2, wherein the support means 25 are designed as support ropes or belts and are guided under the elevator car 2 and around a traction sheave.

The elevator shaft 28 further contains guide rails 29 for the elevator car and guide rails 5 for the counterweight, which serve to guide the elevator car 2 and the counterweight 3, respectively. The counterweight 3 is equipped with (not shown here) a new type of guide concept with special sliding guide shoes, which is described in detail below.

As shown in FIG. 1, the counterweight 3 is fastened directly to the ends of the support means marked 25. However, it is also conceivable that the counterweight has one or, if necessary, several deflection pulleys via which it can be suspended.

Figure 2:
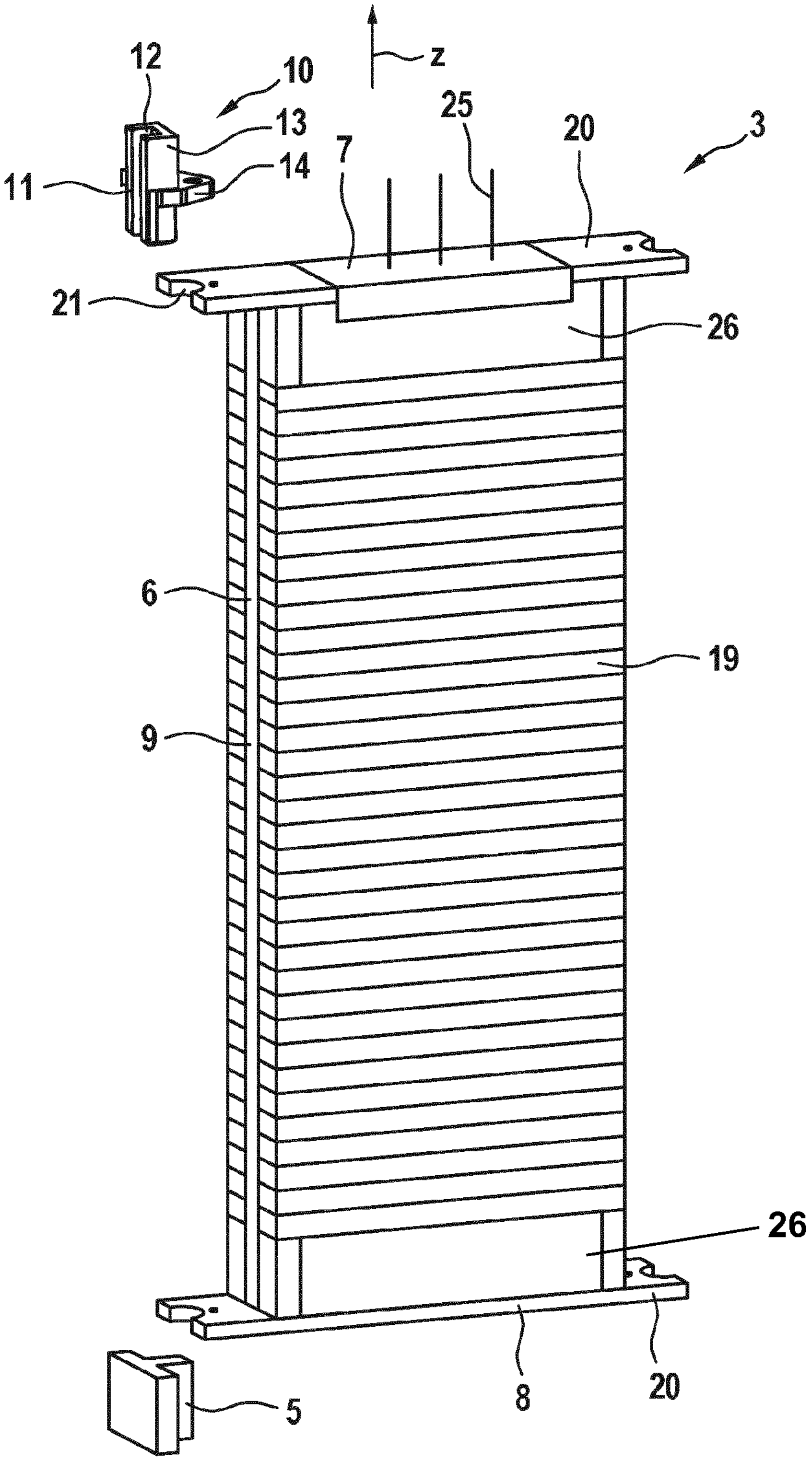
FIG. 2 shows a perspective view of a counterweight for the elevator system in accordance with FIG. 1.

FIG. 2 shows an embodiment of a counterweight 3 of an elevator system 1 in accordance with FIG. 1. Such a counterweight 3 can be used in elevator systems 1 that comprise one counterweight 3 for each elevator car. The counterweight is positioned between two guide rails 5 (only one is shown).

In the present embodiment, the guide rail 5 for the counterweight 3 is formed by a T-profile as an example. The T-profile can, for example, be a steel profile manufactured by rolling. Other suitable guide rails are extruded steel profiles or profiles bent from sheet metal. However, the guide rails can also be made of other metallic materials (e.g. aluminum) and have other profile shapes.

The counterweight 3 comprises a counterweight frame 6 as a support structure for the counterweight. Weight elements 19 are arranged in the counterweight frame 6 and fixed therein. The rectangular counterweight frame 6 has an upper, horizontally extending yoke 7 and a lower yoke 8 wherein the upper and lower yokes 7, 8 respectively terminate the counterweight frame at the top and bottom. The counterweight frame 6 further has the upper yoke and lower yoke interconnecting supports 9 configured as side shields. The vertical supports 9 may be U-shaped in cross-section, for the receptacle of the weight elements 19, which fit between the two U-sections with their open sides facing one another and are thus secured in the same. For fastening the counterweight frame 6 to the support means 25, for example, rope locks or other rope end fastenings can be provided.

Each yoke 7, 8 has two vertical yoke parts 26 extending parallel to one another and a horizontal yoke plate 20 connecting the two yoke parts. Recesses 21 are arranged in the yoke plates 20 of the counterweight frame 6. As can be seen, the U-shaped recesses 21 are arranged on the face sides at the ends of the yoke plates 20, wherein the recesses 21 are directed away from one another.

Sliding guide shoes for guiding the counterweight can be attached to the counterweight frame 6 via these recesses 21. A single sliding guide shoe 10 for insertion into recess 21 can be seen in FIG. 2. The sliding guide shoe 10 has a guide element 11 with an engagement element 13 that can be positively engaged in the recess 21 in the yoke plate 20 of the counterweight frame 6. Further, the guide element 11 comprises a collar 14 subsequently adjoining the engagement element 13. When the guide element 11 is inserted and thus the engagement element 13 is positively received in the recess 21 of the yoke plate 20, collar 14 bears against the yoke plate 20. The collar 14 forms a stop for securing the guide element 11 in position in the longitudinal direction z. With regard to design details of the sliding guide shoe 10, reference is made to FIGS. 6-8, which is of approximately similar design except for a different shape for the guide channel 12.

The yoke plates 20 and their recesses 21 are designed in such a manner that the respective guide rail 5 protrudes into the respective recesses 21, thereby creating an emergency guide if a sliding guide shoe 10 were to accidentally fall away.

Figure 3:
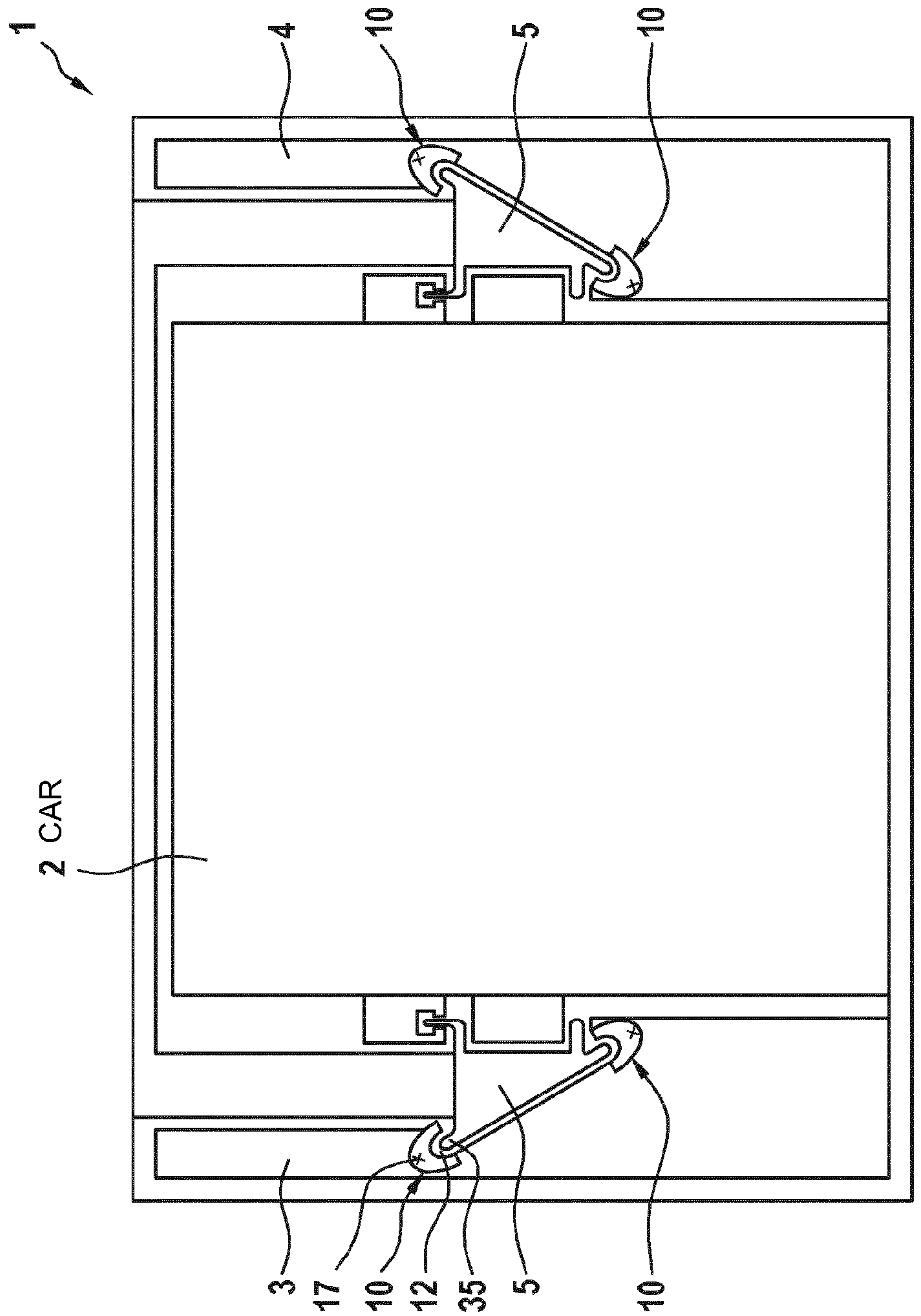
FIG. 3 shows a highly simplified top view of an elevator system with one elevator car and two counterweights.

The elevator system 1 shown in FIG. 3 has two counterweights 3, 4 as well as (not shown) support means and drives. The two drives (e.g. traction sheave drives) drive the respective support means (e.g. belts, steel ropes) and thus move the car 2 and the two counterweights 3, 4 in opposite directions. Each drive is assigned to one of the counterweights 3 or 4. Two guide rails 5 are provided on both sides of the elevator car 2 to guide the elevator car 2 and the counterweights 3, 4.

The elevator system 1 shown in the present embodiment is characterized by special guide rails 5 with which both the elevator car 2 and the respective counterweights 3, 4 serve as linear guides. The guide rails 5 are manufactured as one-piece roll profiles. The elevator system 1 is designed as a so-called "front bag elevator". Further details on the front bag elevator and the guidance of the car and the counterweights with common guide rails can be found in WO 2020/127303 A1 and WO 2020/127787 A1.

The respective counterweights 3, 4 are equipped with the novel sliding guide shoes 10 already mentioned (shown here in schematic form) for guiding the counterweights 3, 4 along the respective guide rails 5 with the guide channels 12 engaging at protrusions 35. This sliding guide shoe 10 is described in detail below.

Figure 4:
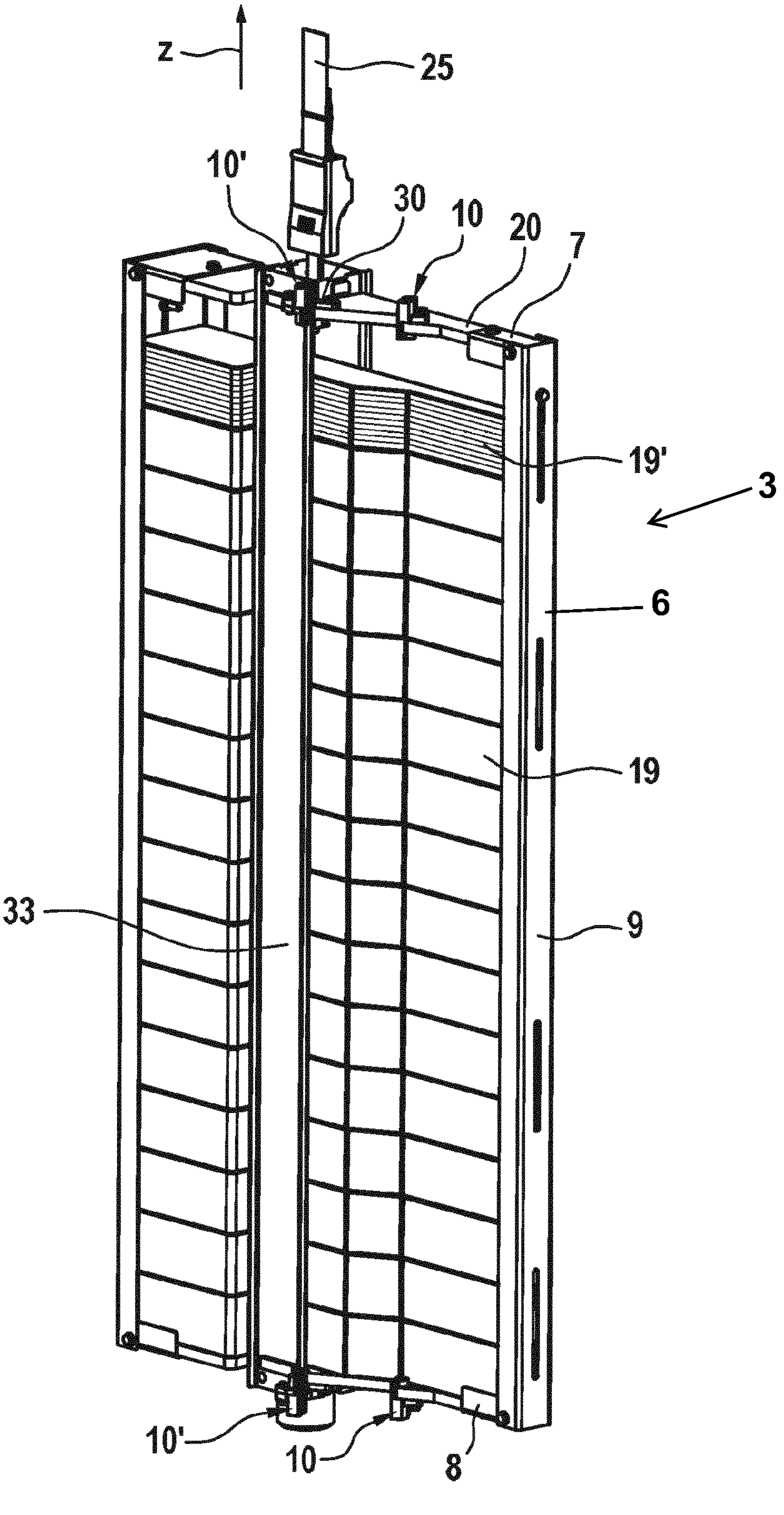
FIG. 4 shows a perspective view of a counterweight for the elevator system in accordance with FIG. 1.

As shown in FIG. 4, the counterweight 3 of the elevator system 1 has a counterweight frame 6 with two vertical supports 9 designed as side plates or shields, two further vertical supports 33 and an upper yoke 7 and a lower yoke 8. A plurality of weight elements 19 are arranged in the counterweight frame 6. The vertical supports 9 and 33 together with the vertical frame parts 7 and 8 form a kind of cage for the weight elements 19. In the present embodiment, two different types of weight elements comprise concrete elements designated 19 and weight elements in the form of steel plates designated 19'.

Two sliding guide shoes 10 are assigned to each of the yokes 7, 8. One of the sliding guide shoes 10 is directly connected to the yoke plate 20. The other sliding guide shoe is marked 10'. This sliding guide shoe 10' has the same design as the sliding guide shoe 10 on the right; however, it is connected to the yoke plate 20 via an extension piece 30. The extension piece 30 is screwed to the yoke plate 20. The extension piece 30 makes it easy to fill the counterweight with weight elements 19.

Figure 5:
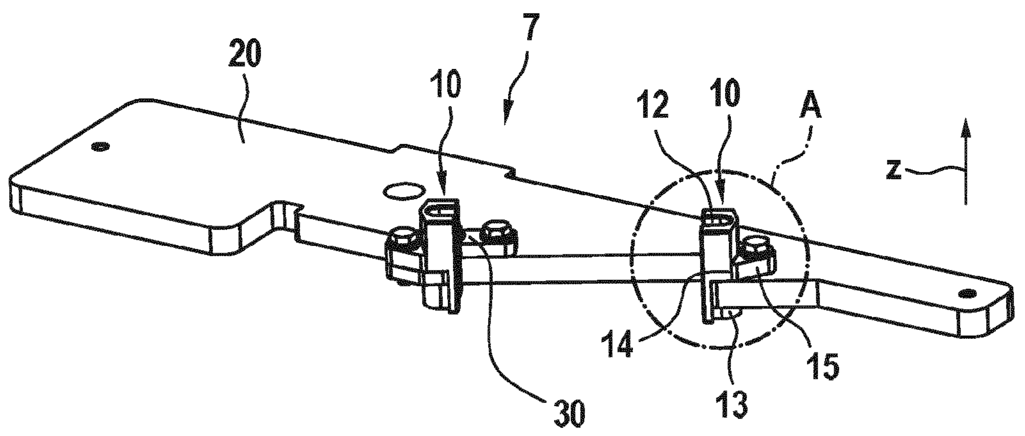
FIG. 5 shows an enlarged perspective view of a yoke plate with two sliding guide shoes of the counterweight from FIG. 4 attached to it.

FIG. 5 shows the upper yoke 7 of the counterweight frame 6. However, the lower yoke 8 has the same design. The extension piece 30, which has a recess for form closure with the sliding guide shoe, is detachably fixed to the yoke plate by means of three screws, as an example.

Figure 6:
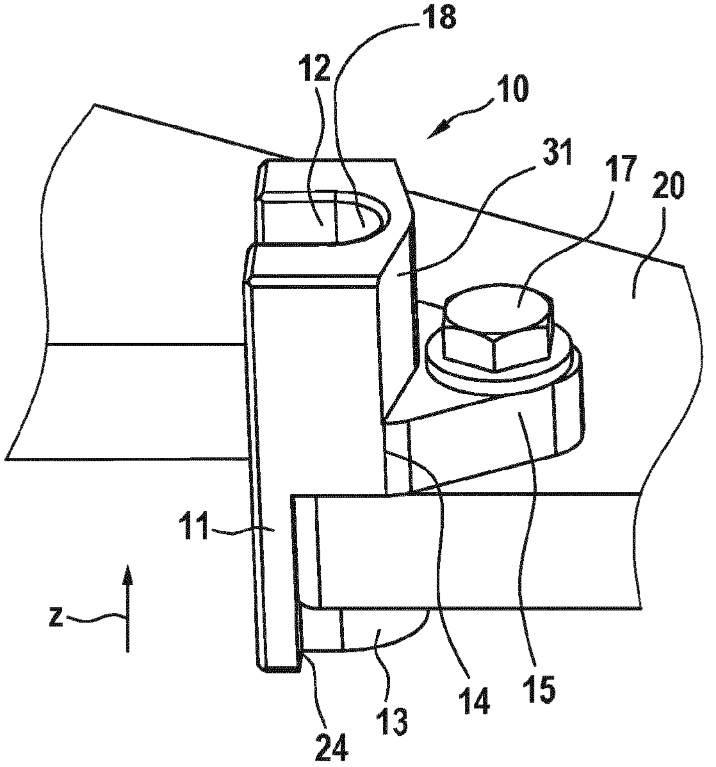
FIG. 6 shows a detailed view of the yoke plate one of the sliding guide shoes of the counterweight (detail A of FIG. 5)

Further details of the sliding guide shoe 10 and how the sliding guide shoe 10 is connected to the yoke plate 20 are shown in FIG. 6. The guide element 11 comprises the engagement element 13 extending in the longitudinal direction z. The engagement element 13 thus extends in the same direction as the guide channel 12. The engagement element 13 is positively received in the complementary recess 21 (see FIG. 2) in the yoke plate 20. The collar 14, which subsequently engages the engagement element 13, embraces the recess 21 and forms—with respect to the longitudinal direction z—a stop for securing the guide element 11 in position. The guide element 11 thus inserted is screwed to the yoke plate 20 using a screw 17 and thus secured.

The engagement element 13 is evidently a shell-like retaining pin which can be fitted or inserted into the recess 21. The engagement element 13 comprises a semicircular active surface extending in the z-direction. The engagement element 13 is fitted into the recess 21 via this active surface. The collar 14 is a flange-like designed elevation that forms a stop in the z-direction. The corresponding stop surface of the stop lies on a plane extending orthogonally to the z-direction. An attachment portion 15 formed at right angles to the longitudinal direction is provided on the collar 14 for fastening the guide element 11 to the counterweight support structure by means of the screw 17. Furthermore, a head part 31 adjoins the collar 14 with respect to the longitudinal direction z. The head part 31 extends the guide channel 12 upward or to the side opposite the engagement element 13.

Figure 7:
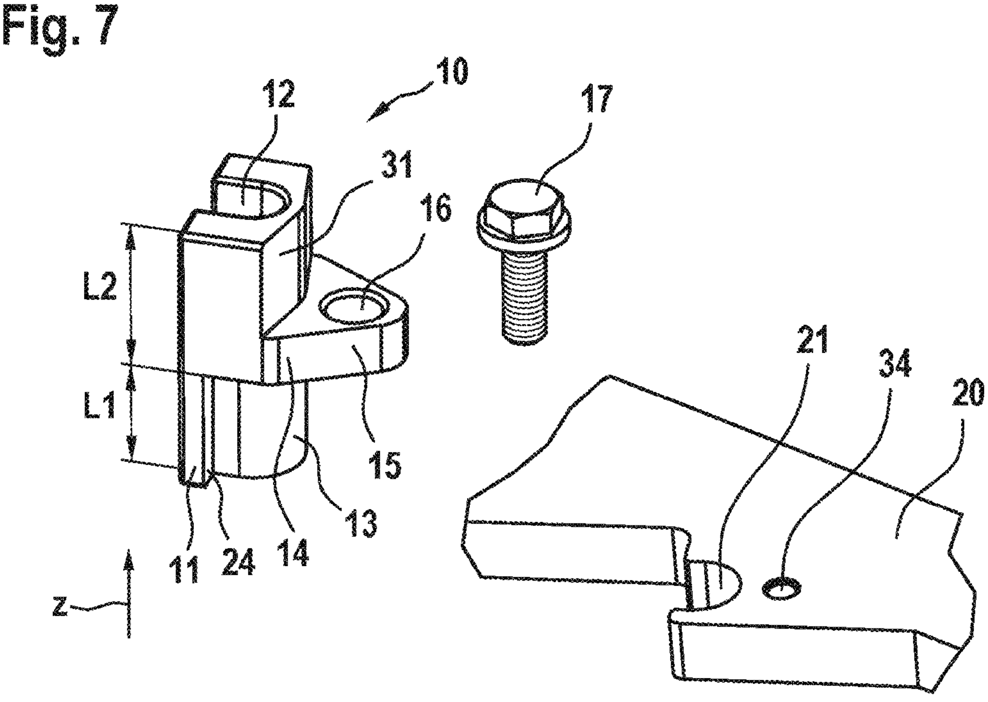
FIG. 7 shows a perspective exploded view of the arrangement in FIG. 6.

As can be seen from FIG. 7, the guide element 11 is segmented with respect to the longitudinal direction z and consists substantially of the following two segments: The first segment is assigned to the engagement element 13. The other or second segment is associated with the collar 14, wherein this segment also includes the head part 31. The stop surface thus forms the dividing line or plane between the two segments. The two segments can be identified in FIG. 7 by the lengths labeled L1 and L2. In the present embodiment, the length L2 of the second segment is slightly greater than the length L1 of the first segment.

Further, it can be seen in FIG. 7 that the attachment portion 15 has a hole 16 for the screw 17 for screwing the guide element 11 to the yoke plate 20. A metal bushing 36 (shown in FIG. 8) can be inserted into the hole 16, which is designed as a through hole, whereby a reinforcement of the attachment area can be achieved. A threaded hole 34 is provided in the yoke plate 20 for screwing on. Of course, instead of the threaded hole there could be an arrangement with a nut. Furthermore, FIG. 7 shows how the recess 21 is designed. The recess 21 is designed in a U-shape.

Figure 8:
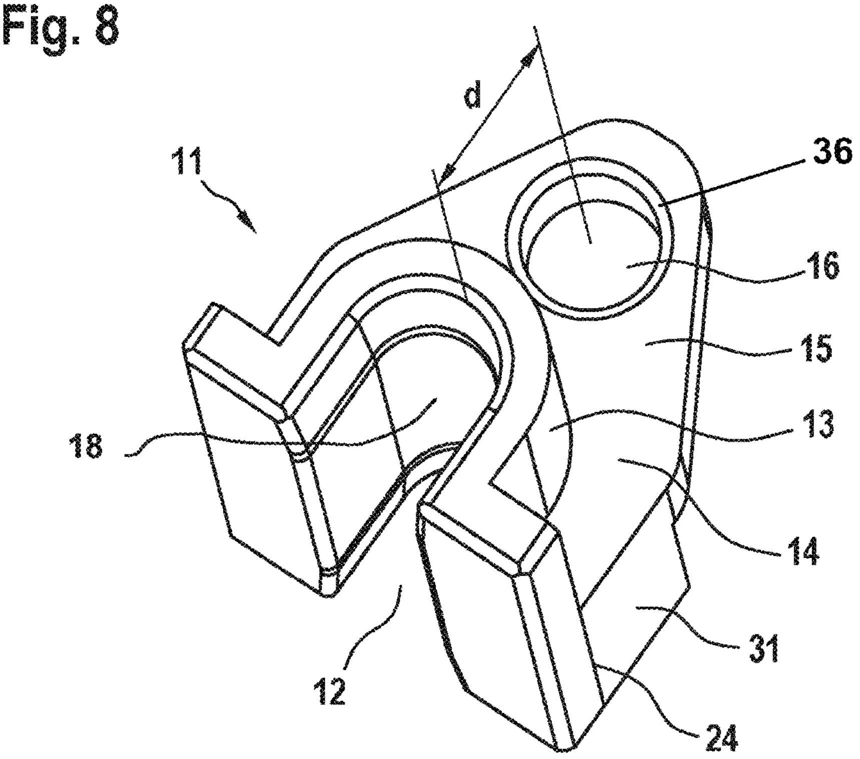
FIG. 8 shows a guide element of the sliding guide shoe in accordance with FIG. 5 from a different angle.

Further constructional details on the design of the sliding guide shoe 10 can be seen in FIG. 8. Thus, it is readily apparent from this that the guide element 11 is characterized by a compact design. The hole 16 is evidently close, usually less than 5 cm from the groove bottom 18 of the guide channel 12. This distance is indicated by d.

It is clear from FIG. 7 and particularly FIG. 8 that the engagement element 13 extending in the longitudinal direction z is designed as a retaining pin that can be fitted or inserted into the recess 21 of the retaining plate 20. As can be seen, the retaining pin has a sectionally cylindrical outer contour and two opposing, plane-parallel side surfaces which form the active surfaces via which the engagement element 13 is fitted in the recess 21. The cylindrical sectional outer contour forms the semicircular, z-direction extension of the engagement element 13 mentioned above. Extending outwardly from the side surfaces are stop surfaces 24 that engage the retaining plate 20 at the opening of the recess 21 to align the hole 16 with the threaded hole 34 before the screw 17 is inserted.

FIG. 8 further shows that the guide channel 12 has a round groove bottom 18 for receptacle of the guide area protrusion 35 of the guide rail 5 shown in previous FIG. 3.

The guide element 11 is designed as a one-piece molded body made of a plastic. In the present example, the guide element 11 is designed as a component produced by means of milling and other metal-cutting methods. Preferably, however, the guide element 11 can be a plastic injection molded part.

The guide element 11 is preferably rigid and made of a plastic that is characterized by a low coefficient of friction. For example, plastics such as UHMW-PE or PTFE can be used for the guide element 11. Of course, other plastics such as PA, PA6 (Perlon®), POM, PEEK, PAS, PUR, PP or PVDF are also possible.

The counterweight frame 6 forms the support structure for supporting the counterweight 3 and, more precisely, a support structure for supporting the weight elements of the counterweight 3. The sliding guide shoe 10 could in itself also be used to guide the elevator car 2. For this purpose, the support structure, for example a so-called catch frame for supporting the car body, would have to be adapted accordingly. Such a catch frame or other support structure could also have plate-like support components such as the horizontal recessed yoke plates of the type described above, into which the guide element 12 can be inserted to form the sliding guide shoe 10.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A sliding guide shoe for guiding an elevator car or a counterweight along a guide rail extending in a longitudinal direction, the sliding guide shoe comprising:

a guide element having a guide channel formed therein;

the guide element including an engagement element extending in the longitudinal direction and adapted to engage in a recess of a support structure of the elevator car or the counterweight;

wherein the engagement element has an outer contour shaped to match a complementary shape of the recess to provide a form closure of the recess when the engagement element is engaged in the recess; and the guide element including a collar adjoining the engagement element, the collar adapted to engage the support structure around the recess and forming a stop securing the guide element on the support structure in a predetermined position in the longitudinal direction.

2. The sliding guide shoe according to claim 1 wherein the guide element is formed as a one-piece molded body made of a plastic material.

3. The sliding guide shoe according to claim 2 wherein the guide element is formed as an injection molded part.

4. The sliding guide shoe according to claim 1 wherein the engagement element is formed as a shell-like retaining pin adapted to be fitted or inserted into the recess.

5. The sliding guide shoe according to claim 1 wherein the guide element includes an attachment portion adapted to fix the guide element to the support structure.

6. The sliding guide shoe according to claim 5 wherein the attachment portion extends from the collar perpendicular to the longitudinal direction.

7. The sliding guide shoe according to claim 5 wherein the attachment portion has a hole formed therein, the hole adapted to receive a screw for screwing the guide element to the support structure.

8. The sliding guide shoe according to claim 7 wherein that the hole is positioned less than 5 cm from a groove bottom of the guide channel.

9. The sliding guide shoe according to claim 7 wherein the hole is a through hole into which a metal bushing is inserted.

10. The sliding guide shoe according to claim 1 wherein the guide element is segmented in the longitudinal direction, the guide element having a first segment including the engagement element and a second segment including the collar, and wherein the second segment has a head part extending in the longitudinal direction.

11. The sliding guide shoe according to claim 10 wherein a length of the second segment is equal to or greater than a length of the first segment.

12. A counterweight for an elevator system, the counterweight comprising:

a counterweight frame adapted to hold a plurality of weight elements, the counterweight frame including at least one yoke;

at least one sliding guide shoe adapted to guide the counterweight along a guide rail;

wherein the at least one sliding guide shoe has a guide element having a guide channel formed therein, the guide element including an engagement element extending in the longitudinal direction and adapted to engage in a recess of a support structure of the counterweight, and the guide element including a collar adjoining the engagement element, the collar adapted to engage the support structure around the recess and forming a stop securing the guide element on the support structure in a predetermined position in the longitudinal direction; and wherein the at least one yoke has a horizontal yoke plate to which the at least one sliding guide shoe is fastened, wherein the yoke plate has a recess formed therein as an emergency guide into which the guide rail projects and in which recess the at least one sliding guide shoe is received.

13. The counterweight according to claim 12 wherein the recess in the yoke plate is U-shaped and the at least one sliding guide shoe includes a guide element with a guide channel formed therein, the guide channel having a round groove bottom.

14. The counterweight according to claim 12 wherein the at least one yoke is an upper yoke and the counterweight frame includes a lower yoke having a horizontal yoke plate.

15. The counterweight according to claim 14 wherein the upper yoke and the lower yoke each have two recesses formed therein aligned with one another, wherein one of the recesses is arranged in the yoke plate of each of the yokes and another of the recesses is arranged on an extension piece detachably fixed to the yoke plate of each of the yokes.

16. An elevator system comprising:

the counterweight according to claim 15; and four of the sliding guide shoes, each of the sliding guide shoes received in an associated one of the recesses and adapted to guide the counterweight on guide rails.

* * * * *